Patented Feb. 19, 1946

2,395,260

UNITED STATES PATENT OFFICE 2,395,260

TREATMENT OF BOILER WATER

Harold C. Farmer, Rosemont, Pa., and Sheppard T. Powell, Baltimore, Md.

No Drawing. Application August 5, 1943, Serial No. 497,540

5 Claims. (Cl. 210—23)

This invention relates to the treatment of boiler water for the purpose of modifying the characteristics of substances entrained in the steam generated therefrom to prevent adherent deposits in superheaters, piping, valves, prime movers and the like through which the steam passes.

During the release of steam from the water in a boiler, substances dissolved and suspended in the boiler water are entrained in the steam as a result of violent ebullition at the surface of the water, or an excessive number of bubbles on the surface, or other causes related to the mechanical design of the boiler, the rate of operation, and the quantity of such substances dissolved and suspended in the boiler water. Such substances in the steam may be in the solid phase and/or in solution or suspension in droplets of water carried over with the steam. These substances carried out of the boiler with the steam comprise the constituents which are present in the boiler water, such as the hydroxide, carbonate, phosphate, chloride and sulphate of sodium, calcium and magnesium, as well as silica, iron, organic matter, and the like. They may be deposited in superheaters, valves, piping and turbines in adherent form and when so deposited they are obstructive and reduce the efficiency of this equipment. Adherent deposits of this type commonly occur in the low-pressure stages of steam turbines, where they impose a resistance to the flow of steam which causes an increase in the back pressure of the higher stages and reduces the power output of such machines. In particular, when such deposits are high in silica content, they are very hard, adherent and difficult to remove, except by dismantling the turbine and cleaning it mechanically, which involves excessive cost and depreciation of the equipment.

A number of methods have been proposed for reducing the quantity of carry-over or mitigating its effect. Thus the rate of steam generation with respect to the boiler surface and volume may be reduced to a point at which carry-over occurs only to a small extent, but this remedy is objectionable because the capacity and efficiency of the steam generating equipment are seriously reduced thereby. Also, the concentrations of dissolved and suspended matter in the boiler water may be maintained at a low level, but this frequently requires blowing to waste an inordinately large quantity of concentrated boiler water, and replacing it with fresh water, thus wasting treated water, heat, and chemicals. Many other processes have been proposed, including the addition of colloidal suspensions of metals and oxides or of certain costly inorganic salts, the use of organic substances known as anti-foam compounds, and the like. These procedures suffer from the disadvantages of introducing a multiplicity of treatment in addition to those required for the basic control of scale and corrosion within the boiler. Also, the constituents added to control carry-over are frequently not susceptible to chemical analysis in boiler water samples as a guide to the control of such procedures.

Furthermore, although these procedures may reduce the amount of carry-over and thus reduce the rate of deposition of such adherent deposits, the deposits continue to build up and the effect of the procedure is merely to increase the interval between mechanical cleanings. Even though the carry-over is reduced to a fraction of one part per million, these objectionable depositions occur if the composition of the material carried over is such as to make it particularly adherent.

The primary object of our invention is to provide a method of treating boiler water which reduces the tendency of solids entrained in the steam to form adherent deposits. A second object of our invention is to accomplish these results by controlling the concentration, in the boiler water, of one or more simple constituents commonly present in such water and susceptible to accurate and rapid chemical analysis. It is a further object of our invention to selectively eliminate adherent silica from deposits formed by carry-over, in favor of salts that can be washed off the turbine blading by flushing with water.

With these and other objects in view which will be apparent as the description proceeds, our invention comprises the maintenance in boiler water of a ratio of chloride concentration to concentration of total dissolved solids of not less than approximately 1 to 6.

Solids carried over in the steam from a boiler are deposited in gradually increasing thicknesses on surfaces over which the steam flows. When the thickness of such deposits on turbine blading and other vulnerable parts builds up to the point where the decrease in efficiency attributable thereto can no longer be tolerated, the deposits must be removed. Where the deposits are of such nature that they may be readily washed out by flushing with water, the process of removal is relatively simple. However, when the deposits are insoluble and adherent, such as when composed chiefly of silica, they cannot be eliminated by flushing with water or solutions harmless to vulnerable parts, but must be removed mechanically by abrasion blasting or similar means. Since the deposits occur on relatively inaccessible parts, this cleaning procedure is expensive because it requires disassembly and a prolonged shut-down of the equipment involved.

We have discovered that there is a critical value of the relative concentration in the boiler water of chlorides to total solids, below which the deposits formed, for example on turbine blading, will be of the adherent type, and above which they will be of non-adherent type (i. e. removable by flushing with water). This critical situation occurs when the chlorides comprise approximately one-sixth of the total solids in the boiler water. When the chlorides are present in a proportion of less than approximately one-sixth of the total solids, adherent deposits will form and when the proportion of chlorides is greater than approximately one-sixth, any deposits formed will be non-adherent.

A typical example of the relation between the nature of the deposit on turbine blading and the relative proportion of chlorides in the boiler water is illustrated by the following data taken from the operating records of a steam power plant.

During a period when the boiler was operated with a typical chloride content of 12 parts per million, representing approximately 2.4% of the total dissolved solids, the back pressure at the first stage of the turbine increased at a rate of 0.25% per week. When the turbine was dismantled for inspection, this increase in back pressure was found to be caused by hard adherent deposits on the turbine blading. On the other hand when our treatment was applied to the same boiler for a period of sixteen weeks to maintain a typical chloride content in the water of 125 parts per million representing approximately 17% of the total solids, there was no detectable increase in first-stage back pressure nor were any solids deposited on the turbine blading.

In the practice of our invention we take samples of boiler water at suitable intervals and immediately determine therefor the concentration of chloride and of total dissolved solids. The chloride content is preferably found by a simple volumetric titration, but any desired analytical procedure can of course be used. From these determinations calculation is made of the quantity of chlorides necessary to be added to bring the boiler water up to the desired relative chloride concentration. For the purpose of preventing adherent deposits, this relative chloride concentration should be not less than approximately one-sixth of total dissolved solids but can exceed that value to any degree found desirable or expedient. If the relative chloride concentration is less than desired, sodium chloride is then added to the boiler water in the calculated quantity.

Although we prefer to add sodium chloride to make up the desired chloride concentration because it is cheap and readily obtainable, the use of any other soluble chloride, including hydrochloric acid, is within the scope of our invention.

For the purpose of accomplishing our objects it is not material how the chloride is added to the boiler water, whether by direct injection or in the feedwater entering the boiler.

It has been our experience that when the boiler water has a relative chloride concentration of less than approximately one-sixth of total solids, deposits of the adherent type will accumulate on turbine blading and the like. On the other hand, it may be necessary to increase the relative chloride concentration considerably above one-sixth to assure that deposits will not form on such parts or that they will be of the non-adherent type.

Furthermore, if it becomes necessary or desirable to increase the concentration of dissolved solids in the boiler water for any reason and if such increased concentration would cause adherent depositions on turbine blading or other parts, this undesirable result can be prevented by merely proportionally increasing the relative concentration of chlorides to not less than one-sixth of the total solids We believe that in practice it will never be necessary to add chlorides in the amount of more than 500 parts per million by weight to the boiler water to produce the desired result. This opinion is based on the premise that it would not be sound practice to operate boilers with dissolved solids present to the extent which would require more than 500 parts per million of chlorides to cause deposits on turbine blades or the like to be non-adherent.

We claim:

1. In a steam flow system comprising a boiler containing water having dissolved solids not in excess of 2500 parts per million by weight and a turbine, the method of inhibiting adherent deposits in said turbine from solids contained in the steam carried over from the boiler, consisting in adding sufficient sodium chloride to the water in the boiler to maintain the relative concentration of chloride to total solids in said water at not less than approximately one-sixth by weight, the concentration of chloride not to exceed 500 parts per million by weight.

2. The herein described process of conditioning boiler water containing compounds of silicon and other dissolved solids, not in excess of 2500 parts per million by weight, for the avoidance of adherent siliceous deposits on turbine blades from steam, which consists in adding a modicum of a soluble chloride to the water prior to its evaporation into steam to the extent that the concentration of chloride is not in excess of 500 parts per million by weight and the proportion of chloride to total dissolved solids is not less than one to six by weight, admixing the chloride with siliceous material, carrying over the admixture from the boiler to the turbine and depositing the admixture in soluble form on said turbine blades.

3. The herein described process for opposing the deposition of siliceous material in hard adherent form upon turbine blades from substances entrained in steam and carried over from boilers having boiler waters containing dissolved solids not exceeding 2500 parts per million by weight, including siliceous material, which consists in adding a soluble chloride to the boiler water to an extent such that the concentration of chloride is not in excess of 500 parts per million by weight and the proportion of chloride to total dissolved solids is not less than one to six by weight, admixing said chloride with said siliceous material and opposing its deposition in adherent form.

4. The herein described process of conditioning boiler water containing compounds of silicon and other dissolved solids in a boiler, for the avoidance of adherent siliceous deposits on turbine blades from steam, which consists in adding to said water sufficient soluble chlorides to bring the ratio of chlorides to total dissolved solids to not less than approximately 1 to 6 by weight, generating steam in the boiler from said water, transmitting said steam from the boiler to the turbine, transporting a mixture of soluble chloride and siliceous material from the boiler to the turbine along with the steam, depositing the mixture in non-adherent condition from the steam upon the turbine blades, and removing the mixture by flushing the turbine with water.

5. The method of treating boiler water in a boiler which comprises the steps of periodically determining the concentration of chlorides and of total solids dissolved in said water and adding to said water in accordance with such determinations sufficient chlorides to maintain the ratio of chlorides to total dissolved solids at not less than approximately 1 to 6 by weight, generating steam in the boiler from said water, transmitting said steam from the boiler to a turbine, transporting siliceous material in admixture wtih soluble chloride from the boiler to the turbine along with the steam, depositing the admixture in non-adherent condition from the steam upon the turbine blades, and removing the admixture by flushing the turbine with water.

HAROLD C. FARMER.
SHEPPARD T. POWELL.